US012334322B2

(12) United States Patent
Cooks et al.

(10) Patent No.: US 12,334,322 B2
(45) Date of Patent: *Jun. 17, 2025

(54) SYSTEMS AND METHODS FOR ISOLATING A TARGET ION IN AN ION TRAP

(71) Applicant: Purdue Research Foundation, West Lafayette, IN (US)

(72) Inventors: Robert Graham Cooks, West Lafayette, IN (US); Dalton Snyder, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 139 days.

This patent is subject to a terminal disclaimer.

(21) Appl. No.: 17/833,337

(22) Filed: Jun. 6, 2022

(65) Prior Publication Data

US 2022/0392756 A1 Dec. 8, 2022

Related U.S. Application Data

(63) Continuation of application No. 16/073,993, filed as application No. PCT/US2017/027415 on Apr. 13, 2017, now Pat. No. 11,355,328.

(60) Provisional application No. 62/321,915, filed on Apr. 13, 2016.

(51) Int. Cl.

*H01J 49/00* (2006.01)
*H01J 49/42* (2006.01)

(52) U.S. Cl.

CPC .......... *H01J 49/0031* (2013.01); *H01J 49/42* (2013.01); *H01J 49/426* (2013.01)

(58) Field of Classification Search

CPC .............................. H01J 49/0031; H01J 49/42

See application file for complete search history.

(56) References Cited

U.S. PATENT DOCUMENTS

| | | | |
|---|---|---|---|
| 4,683,195 | A | 7/1987 | Mullis et al. |
| 5,182,213 | A | 1/1993 | Genshaw et al. |
| 5,198,665 | A | 3/1993 | Wells |
| 5,270,163 | A | 12/1993 | Gold et al. |
| 5,448,061 | A | 9/1995 | Wells |

(Continued)

FOREIGN PATENT DOCUMENTS

| | | | |
|---|---|---|---|
| WO | 2009/102766 | A1 | 8/2009 |
| WO | 2016/53610 | A1 | 4/2016 |

OTHER PUBLICATIONS

Guangming Huang et al., Direct Detection of Benzene, Toluene, and Ethylbenzene at Trace Levels in Ambient Air by Atmospheric Pressure Chemical Ionization Using a Handheld Mass Spectrometer, J Am Soc Mass Spectrom 2010, 21, 132-135 (2009). (Year: 2009).*

(Continued)

*Primary Examiner* — Nicole M Ippolito

(74) *Attorney, Agent, or Firm* — Brown Rudnick LLP; Adam M. Schoen

(57) ABSTRACT

The invention generally relates to systems and methods for isolating a target ion in an ion trap. In certain aspects, the invention provides a system that includes a mass spectrometer having an ion trap, and a central processing unit (CPU). The CPU includes storage coupled to the CPU for storing instructions that when executed by the CPU cause the system to apply a dual frequency waveform to the ion trap that ejects non-target ions from the ion trap while retaining a target ion in the ion trap.

19 Claims, 9 Drawing Sheets

(56) References Cited

U.S. PATENT DOCUMENTS

| | | | | |
|---|---|---|---|---|
| 5,475,096 | A | 12/1995 | Gold et al. | |
| 5,517,025 | A | 5/1996 | Wells et al. | |
| 6,818,395 | B1 | 11/2004 | Quake et al. | |
| 7,169,560 | B2 | 1/2007 | Lapidus et al. | |
| 7,211,390 | B2 | 5/2007 | Rothberg et al. | |
| 7,244,559 | B2 | 7/2007 | Rothberg et al. | |
| 7,264,929 | B2 | 9/2007 | Rothberg et al. | |
| 7,282,337 | B1 | 10/2007 | Harris | |
| 7,323,305 | B2 | 1/2008 | Leamon et al. | |
| 7,335,762 | B2 | 2/2008 | Rothberg et al. | |
| 7,335,897 | B2 | 2/2008 | Takats et al. | |
| 8,304,718 | B2 | 11/2012 | Ouyang et al. | |
| 8,859,956 | B2 | 10/2014 | Ouyang et al. | |
| 10,923,336 | B2 | 2/2021 | Cooks et al. | |
| 2002/0164629 | A1 | 11/2002 | Quake et al. | |
| 2005/0026173 | A1* | 2/2005 | Zabeau | G16B 30/00 435/6.11 |
| 2007/0084994 | A1* | 4/2007 | Wang | H01J 49/424 250/282 |
| 2008/0217527 | A1* | 9/2008 | Wang | H01J 49/005 250/282 |
| 2008/0233575 | A1 | 9/2008 | Harris et al. | |
| 2009/0075252 | A1 | 3/2009 | Harris et al. | |
| 2009/0197257 | A1 | 8/2009 | Harris | |
| 2009/0294661 | A1* | 12/2009 | Hashimoto | H01J 49/4295 250/290 |
| 2011/0297952 | A1 | 12/2011 | Lee et al. | |
| 2012/0119079 | A1 | 5/2012 | Ouyang et al. | |
| 2013/0280819 | A1 | 10/2013 | Cooks et al. | |
| 2014/0081585 | A1 | 3/2014 | Cappucino et al. | |
| 2014/0224981 | A1 | 8/2014 | Owen et al. | |
| 2014/0264004 | A1 | 9/2014 | Cooks et al. | |
| 2015/0255263 | A1* | 9/2015 | Kodera | H01J 49/4285 250/281 |
| 2016/0086781 | A1 | 3/2016 | Cooks et al. | |

OTHER PUBLICATIONS

Alfred, 1993, Resonance excitation of ions stored in a quadrupole ion trap. Part IV. Theory of quadrupolarexcitation, Int. J. Mass Spectrom. Ion Processes, 125:171.

Alheit, 1996, Higher order non-linear resonances in a Paul trap, Int. J. Mass Spectrom. Ion Processes, 154:155.

Chen, 1987, Stored waveform simultaneous mass-selective ejection/excitation for Fourier transform ion cyclotron resonance mass spectrometry, Int. J. Mass Spectrom. Ion. Processes, 79:115.

Chu, 1998, Observation of high-order motional 5 resonances of an ion cloud in a Paul trap, Int. J. Mass Spectrom. Ion Processes, 173:107.

Collings, 2000, Observation of higher order quadrupole excitation frequencies in a linear ion trap, J. Am. Soc. Mass Spectrom., 11:1016.

Collings, 2002, Resonance shifts in the excitation of the n=0, K=1 to 6 quadrupolar resonances for ions confinedin a linear ion trap, J. Am. Soc. Mass Spectrom., 13:577.

Dawson, 1969, Non-linear resonances in quadrupole mass spectrometers due to imperfect fields. II. the quadrupole mass filter and the monopole mass spectrometer, Int. J. Mass Spectrom. Ion Phys., 3:1.

Douglas, 2005, Linear ion traps in mass spectrometry, Mass Spectrom. Rev, 24:1-29.

Feldmann, 1999, Application of a hexapole collision and reaction cell in ICP-MS Part I: Instrumental aspects and operational optimization, Fresenius Journal of Analytical Chemistry, 365:415.

Fico, 2007, Miniaturization and Geometry Optimization of a Polymer-Based Rectilinear Ion Trap, Anal. Chem., vol. 79: pp. 8076-8082.

Franzen, 1994, The non-linear ion trap. Part 5. Nature of non-linear resonances and resonant ion ejection. Int. J. Mass Spectrom. Ion Processes, 130:15-40.

Fulford, 1980, Radio-frequency mass selective excitation and resonant ejection of ions in a three-dimensional quadrupole ion trap, J. Vac. Sci. Technol, 17:829.

Gao, 2006, Handheld rectilinear ion trap mass spectrometer, Anal. Chem, 78(17):5994-6002.

Gao, 2008, Design and Characterization of a Multisource Hand-Held Tandem Mass Spectrometer, Anal. Chem., 80:7198-7205.

Guan, 1989, General phase modulation method for stored waveform inverse Fourier transform excitation for Fourier transform ion cyclotron resonance mass spectrometry, J. Chem. Phys., 91:775-777.

Guan, 1993, Stored waveform inverse Fourier transform axial excitation/ejection for quadrupole ion trap mass spectrometry, Anal. Chem., 65:1288-1294.

Guan, 1996, Stored waveform inverse Fourier transform (SWIFT) ion excitation in trapped-ion mass spectometry—theory and applications, Int. J. Mass Spectrom. Ion Processes, 157/158, 5-37.

Hou, 2011, Sampleing Wand for an Ion Trap Mass Spectrometer, Anal. Chem., 83:1857-1861.

International Preliminary Report on Patentability, PCT Application No. PCT/US2017/027415, 7 pages.

International Search Report and Written Opinion for PCT/US2017/027415, 13 pages.

Julian, 1993, Broad-Band Excitation in the Quadrupole Ion-Trap Mass-Spectrometer Using Shaped Pulses Created with the Inverse Fourier-Transform, Anal. Chem, 65:1827-1833.

Louris, 1987, Instrumentation, Applications, and Energy Deposition in Quadrupole Ion-Trap Tandem MassSpectrometry, Anal. Chem., 59:1677.

Louris, 1990, Ion Isolation and Sequential Stages of Mass-Spectrometry in a Quadrupole Ion Trap Mass-Spectrometer, Int. J. Mass Spectrom. Ion Processes, 96:117-137.

Mar. 1989, Resonance excitation of ions stored in a quadrupole ion trap. Part 1. A simulation study, Int. J. Mass Spectrom. Ion Processes, 95:119-156.

Mar. 1992, Mass-Selective Isolation of Ions Stored in a Quadrupole Ion Trap. A Simulation Study, Int. J. Mass Spectrom. Ion Processes, 112:247-271.

Mar. 2009, Quadrupole ion traps, Mass Spectrom. Rev., 28:961-989.

Mar. 2010, Practical Aspects of Trapped Ion Mass Spectrometry, vol. V, CRC Press Taylor & Francis Group, Boca Raton, FL.

McLuckey, 1991, Selective Ion Isolation/Rejection Over a Broad Mass Range in the Quadrupole Ion Trap, J. Am.Soc. Mass Spectrom., 2:11-21.

Moxom, 2002, Double resonance ejection in a micro ion trap mass spectrometer, Rapid Commun Mass Spectrom, 16:755-760.

Mulligan, 2006, Desorption electrospray ionization with a portable mass spectrometer: in situ analysis of ambient surfaces, Chem. Comm., 1709-1711.

Ouyang, 2009, Handheld Miniature lon trap Mass Spectrometers, Anal Chem, 81(7):2421-2425.

Ouyang, 2009, Miniature Mass Spectrometers, Ann. Rev. anal. Chem, 2:187-214.

Sanders, 2010, Hand-held mass spectrometer for environmentally relevant analytes using a variety of sampling and ionization methods, Euro. J. Mass Spectrom., 16:11-20.

Snyder, 2016, Calibration procedure for secular frequency scanning in ion trap mass spectrometers, Rapid Commun. Mass Spectrom., 30:1190-1196.

Snyder, 2016, Experimental characterization of secular frequency scanning in ion trap mass spectrometers, J. Am. Soc. Mass Spectrom., 27:1243-1255.

Snyder, 2016, Miniature and Fieldable Mass Spectrometers: Recent Advances, Anal. Chem., 88:2-29.

Sokol, 2011, Miniature mass spectrometer equipped with electrospray and desorption electrospray ionization for direct analysis of organics from solids and solutions, Int J Mass Spectrom, 306:187-195.

Soni 1994, Selective Injection and Isolation of Ions in Quadrupole Ion Trap Mass Spectrometry Using Notched Waveforms Created Using the Inverse Fourier Transform, Anal. Chem., 66:2488-2496.

Splendore, 1999, A new ion ejection method employing an asymmetric trapping field to improve the mass scanning performance of an electrodynamic ion trap, Int. J. Mass Spectrom., 191:129-143.

Stafford, 1984, Recent Improvements in and Analytical Applications of Advanced Ion Trap Technology, Int. J. Mass Spectrom. Ion Processes, 60:85-98.

(56) References Cited

OTHER PUBLICATIONS

Wang, 1993, The non-linear resonance ion trap. Part 2. A general theoretical analysis, Int. J. Mass Spectrom. Ion Processes, 124:125-144.
Wang, 2013, The coupling effects of hexapole and octopole fields in quadrupole ion traps: a theoretical study, J. Mass Spectrom, 48:937-944.
Wells, 1995, Field-modulated Selective Ion Storage in a Quadrupole Ion Trap, J.Am. Soc. Mass Spectrom., 6:928-935.
Xu, 2010, Miniaturization of Mass Spectrometry Analysis Systems, JALA, 15(6):433-439.

* cited by examiner

SYSTEMS AND METHODS FOR ISOLATING A TARGET ION IN AN ION TRAP

RELATED APPLICATIONS

The present application is a continuation of nonprovisional U.S. patent application Ser. No. 16/073,993, filed Jul. 30, 2018, which is a 35 U.S.C. § 371 national phase application of PCT/US17/27415, filed Apr. 13, 2017, which claims the benefit of and priority to U.S. provisional application Ser. No. 62/321,915, filed Apr. 13, 2016, the content of each of which is incorporated by reference herein in its entirety.

GOVERNMENT INTEREST

This invention was made with government support under NNX12AB16B and NNX16AJ25G awarded by the National Aeronautics and Space Administration (NASA). The government has certain rights in the invention.

FIELD OF THE INVENTION

The invention generally relates to systems and methods for isolating a target ion in an ion trap.

BACKGROUND

Quadrupole ion traps are one of the main types of mass analyzers employed in mass spectrometry. They are compact devices that are relatively inexpensive and they provide mass spectra with adequate resolution to separate ions differing by 1 Da in mass at unit charge. These systems are widely used due to their pressure tolerance, high sensitivity and resolution, and capabilities for single analyzer product ion scans.

Mass-selective ion isolation in quadrupole ion traps is typically performed using stored waveform inverse Fourier transform (SWIFT) techniques, which exhibit excellent performance and versatility but require complex calculations and waveform generation.

SUMMARY

The invention provides systems that implement a simplified approach for mass-selective ion isolation. Aspects of the invention are accomplished using a single dipolar waveform with two frequency components. One frequency is chosen to eject ions lower in mass than the ion to be isolated, and the other frequency is chosen to eject ions higher in mass. The ion of interest is thereby isolated with a dual frequency waveform of amplitude such that significant frequency broadening occurs. The frequency components of the dual frequency waveform can be applied simultaneously or sequentially. In that manner, the invention provides a simple alternative to SWIFT isolation using dual frequencies corresponding to a broad range of linear resonances. The number of frequencies required for isolation of a single ion is reduced by three orders of magnitude and performance is largely unaffected compared to SWIFT. Portable instruments in particular benefit from this simpler method of ion isolation.

In certain aspects, the invention provides a system that includes a mass spectrometer having an ion trap, and a central processing unit (CPU). The CPU includes storage coupled to the CPU for storing instructions that when executed by the CPU cause the system to apply a dual frequency waveform to the ion trap that ejects non-target ions from the ion trap while retaining a target ion in the ion trap. In certain embodiments, the CPU is further caused to apply a third frequency along with the dual frequency waveform in order to isolate a second target ion. In fact, multiple ions can be isolated. For example, two frequencies may be used to isolate one ion, three frequencies may be used to isolate two ions, four frequencies may be used to isolate three ions, etc.

The mass spectrometer may be a bench-top or miniature mass spectrometer, such as described for example in Gao et al. (Z. Anal. 15 Chem. 2006, 78, 5994-6002), Gao et al. (Anal. Chem., 80:7198-7205, 2008), Hou et al. (Anal. Chem., 83:1857-1861, 2011), Sokol et al. (Int. J. Mass Spectrom., 2011, 306, 187-195), Xu et al. (JALA, 2010, 15, 433-439); Ouyang et al. (Anal. Chem., 2009, 81, 2421-2425); Ouyang et al. (Ann. Rev. Anal. Chem., 2009, 2, 187-25 214); Sanders et al. (Euro. J. Mass Spectrom., 2009, 16, 11-20); Gao et al. (Anal. Chem., 2006, 78(17), 5994-6002); Mulligan et al. (Chem. Com., 2006, 1709-1711); and Fico et al. (Anal. Chem., 2007, 79, 8076-8082).), the content of each of which is incorporated herein by reference in its entirety. The mass spectrometer, or miniature mass spectrometer may optionally include a discontinuous interface, such as a discontinuous atmospheric pressure interface (U.S. Pat. No. 8,304,718, the content of which is incorporated by reference herein in its entirety).

In certain embodiments, the dual frequency waveform is a sinusoidal waveform. A target ion will have a secular frequency. A first frequency of the dual frequency waveform is higher than the secular frequency of the target ion. A second frequency of the dual frequency waveform is lower than the secular frequency of the target ion. In that manner, non-target ions are ejected from the ion trap while the target ion remains in the ion trap.

The first and second frequencies may be accessible by low alternating current (AC) amplitudes. More frequencies are accessed/accessible at high amplitudes. Both major and minor components of complex mixtures are isolated, with little signal attenuation. Typically, isolation is performed at low Mathieu q values as more resonances are then easily accessible. This contrasts with SWIFT isolation, which is generally performed at high q values (q=0.8).

BRIEF DESCRIPTION OF THE DRAWINGS

FIG. 4A shows full mass spectrum of a mixture of 4-bromoaniline, 4-chloroaniline, and 2,4-dichloroaniline obtained by boundary ejection, (FIG. 4B) shows isolation of both isotopes of 4-bromoaniline, and FIG. 4C shows isolation of only one isotope. Isolation waveform was 69 kHz, 16.96 $V_{pp}$, and 149 kHz 2.63 $V_{pp}$ for (FIG. 4B) and 69 kHz, 16.96 $V_{pp}$, and 157 kHz, 2.63 $V_{pp}$ for (FIG. 4B). The rf amplitude was 370 $V_{0\text{-}p}$, in FIG. 4B and FIG. 4C.

FIG. 5A shows the full scan boundary ejection spectrum of a mixture of herbicides and their metabolites (EPA 508.1 herbicide mix), whereas FIG. 5B shows dual frequency isolation of a major component (m/z 481) and FIG. 5C shows isolation of a minor component (m/z 292). Experimental details are as follows: (FIG. 5B) 30 ms isolation waveform of 66 kHz, 20.58 $V_{pp}$, and 254 kHz, 9.63 $V_{pp}$, rf amplitude of 370 $V_{0\text{-}p}$. (FIG. 5C) 30 ms isolation waveform of 64.1 kHz, 3.6 $V_{pp}$, plus 166 kHz, 17.28 $V_{pp}$, rf amplitude of 287 $V_{0\text{-}p}$.

DETAILED DESCRIPTION

Figure 1:
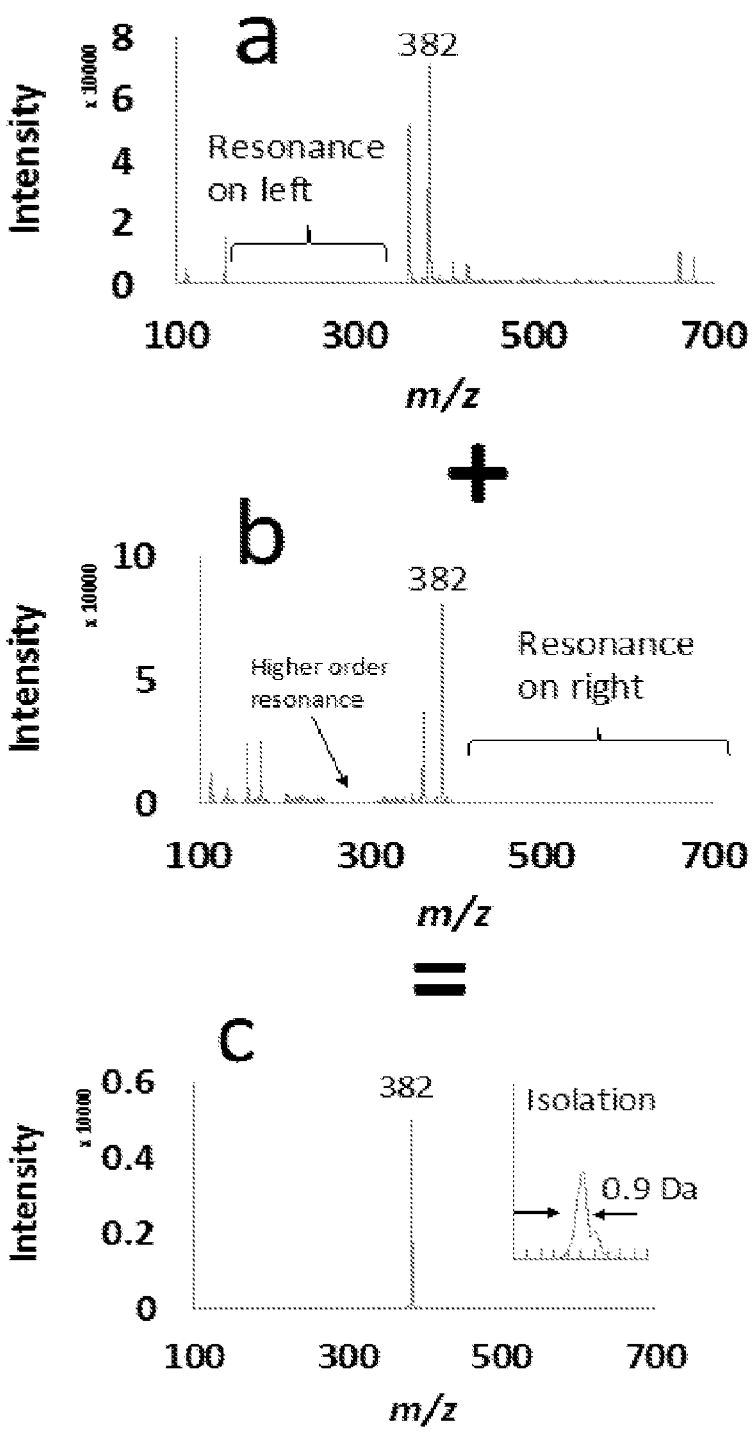
FIG. 1 panels A-C show that dual resonance frequencies enable ion isolation in a quadrupole ion trap. The rf amplitude was set at ~287 $V_{0\text{-}p}$ while either a (panel A) 150 kHz, 7.97 $V_{pp}$ or (panel B) 68.4 kHz, 5.98 $V_{pp}$ waveform was applied during a 30 ms isolation period, resulting in ejection of lighter and heavier ions, respectively, from the trap. Application of both waveforms simultaneously, as in (panel C), results in isolation of m/z 382.

The invention generally relates to systems and methods for simplifying mass-selective ion isolation using a single dipolar waveform with two frequency components. Systems of the invention use one frequency to eject ions lower in mass than the ion to be isolated, and a second frequency to eject ions higher in mass. Systems thereby isolate the ion of interest with a dual frequency waveform of such amplitude that significant frequency broadening occurs. The invention provides a simple alternative to current SWIFT isolation techniques through the use dual frequencies corresponding to a broad range of linear resonances. The inventive system thereby reduces the number of frequencies required for isolation of a single ion by three orders of magnitude while providing performance generally comparable to SWIFT.

SWIFT, while providing good performance, requires complex calculations and waveform generation and, therefore, the present invention provides a significant improvement, especially useful in small, portable mass spectrometry systems.

Ion trap resonances are frequencies of ion motion induced by the presence of an oscillating electric field and can be broadly divided into these categories: (i) the secular frequency, (ii) quadrupolar resonances, (iii) sideband frequencies, (iv) harmonics of the secular frequency, and (v) nonlinear resonances. See, J. Franzen. The non-linear ion trap. Part 5. Nature of non-linear resonances and resonant ion ejection. Int. J. Mass Spectrom. Ion Processes 1994, 130, 15; R. Alheit, S. Kleineidam, F. Vedel, M. Vedel, G. Werth. Higher order non-linear resonances in a Paul trap. Int. J. Mass Spectrom. Ion Processes 1996, 154, 155; X. Z. Chu, M. Holzki, R. Alheit, G. Werth. Observation of high-order motional resonances of an ion cloud in a Paul trap. Int. J. Mass Spectrom. Ion Processes 1998, 173, 107; the contents of each of which are incorporated herein by reference. The secular frequency, $\omega_{u,0}$, (R. E. March. Quadrupole ion traps. Mass Spectrom. Rev. 2009, 28, 961, incorporated herein by reference) is given by $$\omega_{u,0}=\beta_u\Omega/2 \quad \text{Eq. 1}$$

where $\beta_u$ is the dimensionless Mathieu parameter ($0\leq\beta_u\leq1$) for dimension u (x, y, r, or z) given as a function of the Mathieu q value (R. E. March, J. F. J. Todd, Practical Aspects of Trapped Ion Mass Spectrometry, Vol. IV, CRC Press Taylor & Francis Group, Boca Raton, FL, 2010, incorporated herein by reference) and Ω is the angular frequency of the driving radiofrequency (rf) waveform. The secular frequency is the frequency that dominates ion motion, particularly far from the Mathieu stability boundary. Harmonics of the secular frequency can be observed at $2\omega_{u,0}$, $3\omega_{u,0}$, and so on.

Quadrupolar resonances can be accessed by application of a parametric excitation, with the primary parametric resonance at twice the secular frequency and higher order quadrupolar resonances at $$\omega_{u,n}=|n+\beta_u|\Omega/K \quad -\infty<n<\infty, K=1,2, \quad \text{Eq. 2}$$

where n is an integer and K is the order of the resonance. See, B. A. Collings, D. J. Douglas. Observation of higher order quadrupole excitation frequencies in a linear ion trap. J. Am. Soc. Mass Spectrom. 2000, 11, 1016; B. A. Collings, M. Sudakov, F. A. Londry. Resonance shifts in the excitation of the n=0, K=1 to 6 quadrupolar resonances for ions confined in a linear ion trap. J. Am. Soc. Mass Spectrom. 2002, 13, 577; R. L. Alfred, F. A. Londry, R. E. March. Resonance excitation of ions stored in a quadrupole ion trap. Part IV. Theory of quadrupolar excitation. Int. J. Mass Spectrom. Ion Processes 1993, 125, 171; the contents of each of which are incorporated herein by reference.

Sideband frequencies result from the interference of the rf driving frequency with the ion's fundamental secular frequency, (Y. Wang, J. Franzen, K. P. Wanczek. The non-linear resonance ion trap. Part 2. A general theoretical analysis. Int. J. Mass Spectrom. Ion Processes 1993, 124, 125, incorporated herein by reference) and are given by $n_u\omega_{u,n}\pm v\Omega$, where v and $n_u$ are integers. Superposition of an odd-order field (e.g. hexapole) on the quadrupole field leads to observation of both even and odd harmonics and sidebands of those harmonics, whereas only odd harmonics and their sidebands are observed for even-order fields.

Nonlinear resonances result from the coupling of ion motion with higher-order multipole fields (e.g. hexapole, octopole, decapole, etc.). See, Y. Wang, Z. Huang, Y. Jiang, X. Xiong, Y. Deng, X. Fang, W. Xu. The coupling effects of hexapole and octopole fields in quadrupole ion traps: a theoretical study. J. Mass Spectrom. 2013, 48, 937; P. H. Dawson, N. R. Whetten. Non-linear resonances in quadrupole mass spectrometers due to imperfect fields. II. the quadrupole mass filter and the monopole mass spectrometer. Int. J. Mass Spectrom. Ion Phys. 1969, 3, 1; P. H. Dawson, N. R. Whetten. Non-linear resonances in quadrupole mass spectrometers due to imperfect fields I. The quadrupole ion trap. Int. J. Mass Spectrom. Ion Phys. 1969, 2, 45; the contents of each of which are incorporated herein by reference. These resonances are observed on iso-β lines (with no DC potential, as single q values); for example, $\beta=2/3$ corresponds to a hexapole resonance and $\beta=1/2$ corresponds to an octopole resonance. Typically only even-order resonances are observed since odd-order resonances, which represent an asymmetric electric field, are not present due to electrode symmetry; however, they can be induced by application of an appropriate field or by modifying the electrode structure. I. Feldmann, N. Jakubowski, D. Stuewer. Application of a hexapole collision and reaction cell in ICP-MS Part I: Instrumental aspects and operational optimization. Fresenius Journal of Analytical Chemistry 1999, 365, 415, incorporated herein by reference.

The general resonance equation is given by $$n_r\omega_r+n_z\omega_z=\nu\Omega \qquad \text{Eq. 3}$$

where $n_r$ and $n_z$ are even integers for traps with symmetry in r and z, v is an integer, and $\omega_r$ and $\omega_z$ are the secular frequencies of ion motion in the x and y directions, respectively. The hexapole resonance is observed when $n_r+n_z=3$, the octopole resonance is observed when $n_r+n_z=4$, and so on, but $n_r$ must be even for axially symmetric traps and $n_z$ must be even in the presence of even-order fields but either even or odd for odd-order fields. J. Moxom, P. T. Reilly, W. B. Whitten, J. M. Ramsey. Double resonance ejection in a micro ion trap mass spectrometer. Rapid Commun Mass Spectrom 2002, 16, 755, incorporated herein by reference.

There are three general methods that utilize ion trap resonances for mass-selective operations. The first is resonance ejection, which is a variant of the mass-selective instability scan. G. C. Stafford, P. E. Kelley, J. E. P. Syka, W. E. Reynolds, J. F. J. Todd. Recent Improvements in and Analytical Applications of Advanced Ion Trap Technology. Int. J. Mass Spectrom. Ion Processes 1984, 60, 85, incorporated herein by references. In mass-selective instability techniques, the rf amplitude is ramped linearly with time in order to eject and detect ions of increasing m/z. In resonance ejection, (J. N. Louris, R. G. Cooks, J. E. P. Syka, P. E. Kelley, G. C. Stafford, J. F. J. Todd. Instrumentation, Applications, and Energy Deposition in Quadrupole Ion-Trap Tandem Mass-Spectrometry. Anal. Chem. 1987, 59, 1677; J. E. Fulford. Radio-frequency mass selective excitation and resonant ejection of ions in a three-dimensional quadrupole ion trap. J. Vac. Sci. Technol. 1980, 17, 829; the contents of each of which are incorporated herein by reference) a dipolar or quadrupolar ac potential is applied to the trap electrodes in order to produce a “hole” on the q axis of the Mathieu stability diagram. This makes ions whose frequencies of motion match the frequency of the ac unstable; thus these ions are ejected. The rf amplitude is ramped in order to increase the secular frequencies of all ions in the trap (increasing $\beta_u$ in eq. 1) until each comes into resonance with the applied ac, at which point the ions are mass selectively ejected. Thus, mass selectivity is attained due to differences in ion inertia, which cause ions to oscillate at different frequencies.

Double and triple resonance ejection are similar methods that achieve superior performance to resonance ejection as described above in terms of sensitivity and resolution. A double resonance technique is performed by making the frequency of the applied supplementary ac match the frequency corresponding to a nonlinear resonance point (e.g. $\beta_u=1/2$, 2/3). J. Moxom, P. T. Reilly, W. B. Whitten, J. M. Ramsey. Double resonance ejection in a micro ion trap mass spectrometer. Rapid Commun. Mass Spectrom. 2002, 16, 755, incorporated herein by reference. A triple resonance is similarly performed by combining the two aforementioned techniques, that is, by simultaneously applying two different frequencies (i.e. the secular frequency and a sideband) that correspond to a nonlinear resonance point. M. Splendore, E. Marquette, J. Oppenheimer, C. Huston, G. Wells. A new ion ejection method employing an asymmetric trapping field to improve the mass scanning performance of an electrodynamic ion trap. Int. J. Mass Spectrom. 1999, 191, 129, incorporated herein by reference.

The activation step in collision-induced dissociation is a second general method that utilizes ion frequencies of motion in mass-selective operations. See, R. E. March, A. W. McMahon, F. A. Londry, R. L. Alfred, J. F. J. Todd, F. Vedel. Resonance excitation of ions stored in a quadrupole ion trap. Part 1. A simulation study. Int. J. Mass Spectrom. Ion Processes 1989, 95, 119; R. K. Julian, R. G. Cooks. Broad-Band Excitation in the Quadrupole Ion-Trap Mass-Spectrometer Using Shaped Pulses Created with the Inverse Fourier-Transform. Anal. Chem. 1993, 65, 1827; the contents of each of which are incorporated herein by reference. Typically, a low-amplitude supplementary ac potential with a frequency corresponding to that of ions of a particular m/z is applied (in either a dipolar or quadrupolar manner) to the trap for a short duration. This causes the mass selected ions to increase their amplitudes in the trap, occupy regions of greater electric field strength, and gain kinetic energy. Collisions with intentionally-introduced surrounding bath gas molecules such as helium or nitrogen then result in conversion of kinetic energy to internal energy and hence to ion fragmentation, from which structural information regarding the precursor ion can be deduced after the product ions are mass analyzed.

One method of using ion trap resonances for ion isolation is to ramp the rf amplitude up and subsequently down, ejecting ions whose m/z values are below and above the m/z value of interest, respectively. S. A. McLuckey, D. E. Goeringer, G. L. Glish. Selective ion isolation/rejection over a broad mass range in the quadrupole ion trap. J. Am. Soc. Mass Spectrom. 1991, 2, 11, incorporated herein by reference. In a second method, the ion of interest is placed at the apex ($a_z=0.150$, $q_z=0.781$ in the case of a 3D trap) of the Mathieu stability diagram by applying appropriate dc and rf potentials, thereby ejecting all other ions from the trap. See, J. N. Louris, J. S. Brodbeltlustig, R. G. Cooks, G. L. Glish, G. J. Vanberkel, S. A. Mcluckey. Ion Isolation and Sequential Stages of Mass-Spectrometry in a Quadrupole Ion Trap Mass-Spectrometer. Int. J. Mass Spectrom. Ion Processes 1990, 96, 117; R. E. March, F. A. Londry, R. L. Alfred, A. M. Franklin, J. F. J. Todd. Mass-Selective Isolation of Ions Stored in a Quadrupole Ion Trap—a Simulation Study. Int. J. Mass Spectrom. Ion Processes 1992, 112, 247; the contents of each of which are incorporated herein by reference. Secular frequency scanning, (D. T. Snyder, C. J. Pulliam, J. S. Wiley, J. Duncan, R. G. Cooks. Experimental characterization of secular frequency scanning in ion trap mass spectrometers. J. Am. Soc. Mass Spectrom. 2016; D. T. Snyder, C. J. Pulliam, R. G. Cooks. Calibration procedure for secular frequency scanning in ion trap mass spectrometers. Rapid Commun. Mass Spectrom. 2016; the contents of each of which are incorporated herein by reference) in which the frequency of the supplemental ac signal is swept through all but that of some selected ion species, can also be used for ion isolation. However, the most commonly used technique implements the stored waveform inverse Fourier transform (SWIFT) (S. Guan, A. G. Marshall. Stored waveform inverse Fourier transform (SWIFT) ion excitation in trapped-ion mass spectometry—theory and applications. Int. J. Mass Spectrom. Ion Processes 1996, 157/158, 5, incorporated herein by reference) —a method adopted from the Fourier transform ion cyclotron resonance mass spectrometer (L. Chen, A. G. Marchall. Stored waveform simultaneous mass-selective ejection/excitation for Fourier transform ion cyclotron resonance mass spectrometry. Int. J. Mass Spectrom. Ion. Processes 1987, 79, 115, incorporated herein by reference) —to simultaneously eject all ions except those of interest using a complex waveform composed of multiple sinusoids of different frequencies. This waveform must be calculated beforehand as follows. First, the m/z values of the ions to be ejected are converted to their respective secular frequencies. The phases for these frequencies are purposely allotted according to a quadratic function to distribute the power of the waveform evenly throughout its application. See, S. Guan. General phase modulation method for stored waveform inverse Fourier transform excitation for Fourier transform ion cyclotron resonance mass spectrometry. J. Chem. Phys. 1989, 91, 775, incorporated herein by reference. The frequencies and their amplitudes are then inverse Fourier transformed to obtain a time-domain waveform that must be generated by a direct digital synthesizer or similar hardware. It has been shown that multiple non-adjacent ions, which require multiple "notches" (frequencies which are removed from the SWIFT waveform), can be isolated. M. H. Sonl, R. G. Cooks. Selective Injection and Isolation of Ions in Quadrupole Ion Trap Mass Spectrometry Using Notched Waveforms Created Using the Inverse Fourier Transform. Anal. Chem. 1994, 66, 2488, incorporated herein by reference. An amplitude modulation technique which reduces the number of frequencies needed for SWIFT waveforms, which in a typical isolation is some ~1,000 frequencies, has also been demonstrated, (G. Wellscor, C. Huston. Field-modulated selective ion storage in a quadrupole ion trap. J. Am. Soc. Mass Spectrom. 1995, 6, 928, incorporate herein by reference) but these waveforms still require complex calculation.

The present invention provides a significant advancement over the above-described techniques by applying a much simpler dual-frequency waveform consisting of a combination of two linear resonances to the trap electrodes. The two frequencies can be applied simultaneously or successively. This method is markedly simpler than the widely-used SWIFT isolation technique for isolation of ions of a single m/z value; despite this, it can easily resolve bromine isotopes and is efficient in terms of retaining trapped ions of interest. The inventive methods may find particular applicability in miniature mass spectrometers, (see, Z. Ouyang, R. G. Cooks. Miniature mass spectrometers. Annu. Rev. Anal. Chem. 2009, 2, 187; D. T. Snyder, C. J. Pulliam, Z. Ouyang, R. G. Cooks. Miniature and Fieldable Mass Spectrometers: Recent Advances. Anal. Chem. 2016, 88, 2; the contents of each of which are incorporated herein by reference) which benefit from small, simple, and power-efficient electronics.

A general procedure for dual-frequency isolation in a quadrupole ion trap is given in FIG. 1 panels A-C. The secular frequency of the ion of interest is sandwiched between two resonances, either linear or nonlinear in nature, so that ions with m/z values below (FIG. 1 panel A) and above (FIG. 1 panel B) the m/z value of the ion to be isolated are ejected from the trap. There are many important considerations to take into account when choosing these resonances as well as the q value at which the isolated ion is to be placed. In general more resonances are accessible at lower q values due to lower pseudo-potential well depth, thus allowing easy access at lower ac amplitudes. See, D. J. Douglas, A. J. Frank, D. Mao. Linear ion traps in mass spectrometry. Mass Spectrom. Rev. 2005, 24, 1, incorporated herein by reference. At higher q values, these resonances are more difficult to access, and thus higher ac amplitudes are needed.

The chosen frequencies, which may be empirically determined, can be accessible by low ac amplitudes and many ion's resonances may be accessible upon increasing the ac amplitude. As the component that dominates ion motion, the secular frequency is a preferred candidate for the isolation waveforms. FIG. 1 panel C shows the result of applying a dual frequency waveform which is the sum of the resonance at 150 kHz ($\beta_x$=0.26, eq. 1) and another resonance at 68.4 kHz ($\beta_x$=0.12, eq. 1). The frequencies and ac amplitudes of each were adjusted so that ions with masses greater and less than that of the ion to be isolated ($C^+$, m/z 382) are ejected during the 30 ms isolation period. As shown, the high ac amplitudes cause broadband ejection of ions from the trap, and if the centers of the ejection bands are placed appropriately below and above the ion of interest, ion isolation can be accomplished. Thus, only two frequencies are used in the systems and methods of the invention, which is a dramatic reduction from current practice.

Figure 2A:
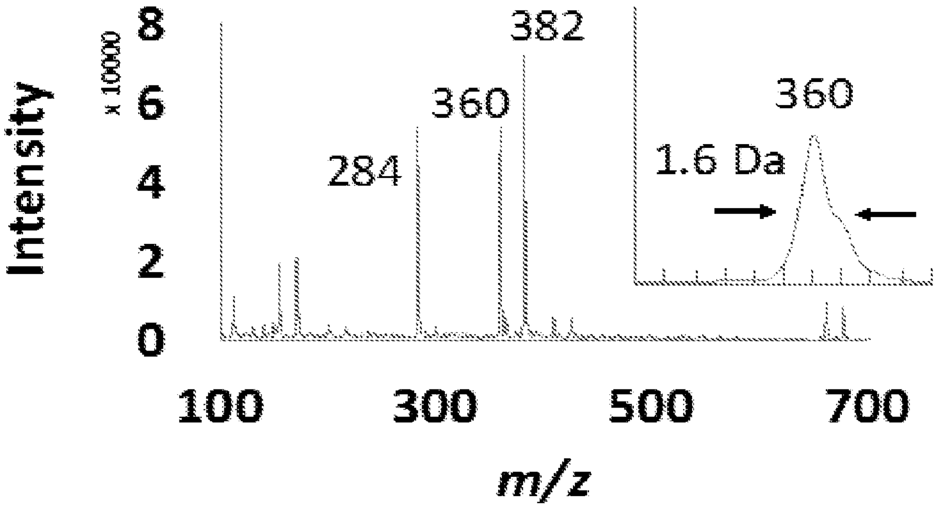
FIGS. 2A-C show broadband isolation in an ion trap using dual higher order resonance frequencies. The spectrum in FIG. 2A shows the boundary ejection mass spectrum of a mixture of three quaternary amines (m/z 284, 360, and 382). The spectra in FIGS. 2B-C show isolation of m/z 284 and 360 using dipolar application of a dual frequency resonance waveform consisting of two linear resonances. Experimental details are as follows: LTQ linear ion trap mass spectrometer, (FIG. 2A) boundary ejection using a scan rate of 60 μs/Da, (FIG. 2B-C) boundary ejection after application of a 30 ms waveform with frequency components (FIG. 2B) 68.4 kHz, 3.26 $V_{pp}$, and 149 kHz, 7.12 $V_{pp}$, and (FIG. 2C) 68.4 kHz, 5.60 $V_{pp}$, and 150 kHz, 7.97 $V_{pp}$. The rf amplitude was ~200 $V_{0\text{-}p}$ in (FIG. 2B) and ~270 $V_{0\text{-}p}$ in (FIG. 2C). All spectra are averaged from ~30 scans.
Figure 2B:
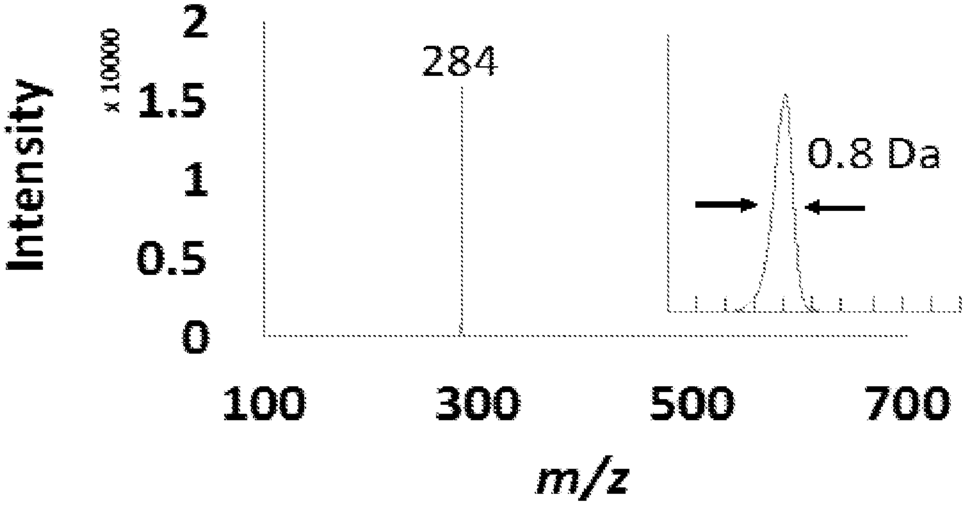
Figure 2C:
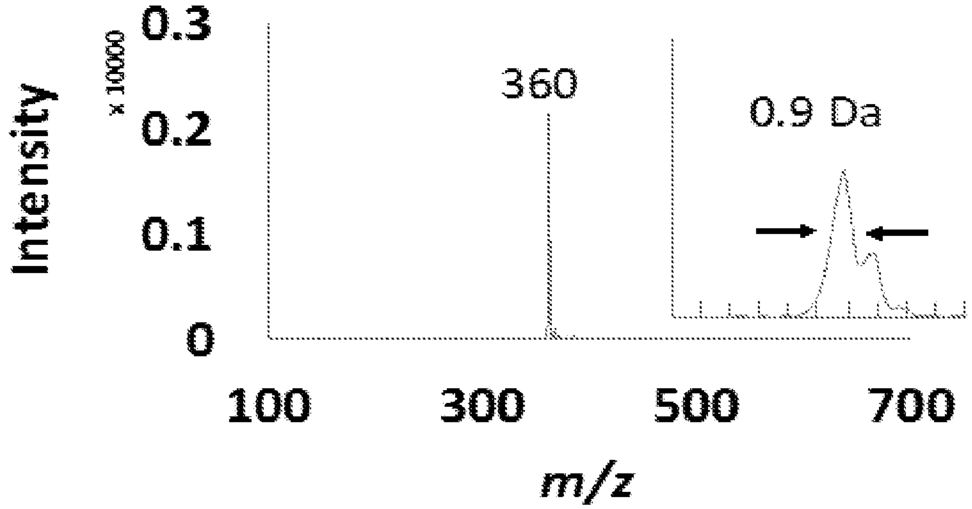

The general applicability of this simple method is demonstrated in FIGS. 2A-C, where cations (m/z 284, 360) of another pair of quaternary ammonium salts are easily isolated from other compounds in the mixture. Each of the isolated ions shows increased resolution, which may be due to a reduction in space charge during the boundary ejection scan. Methods of the invention may require slight fine-tuning of the frequencies and ac amplitudes but does not require the calculation and synthesis of a broadband SWIFT waveform, nor does it require a direct digital synthesizer or similar waveform generator, reducing instrument complexity and computational time.

Figure 3A:
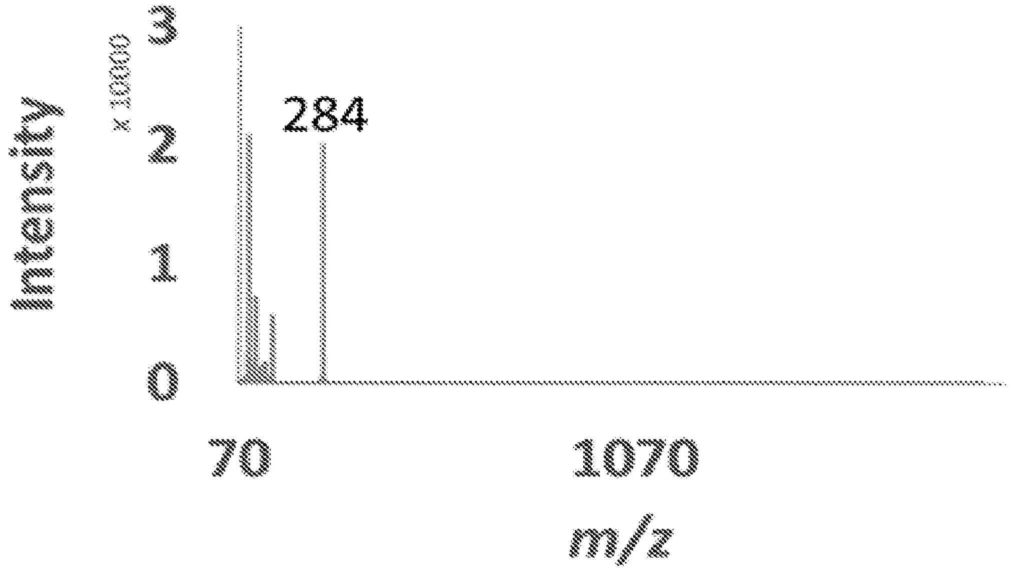
FIGS. 3A-B show dual and triple frequency isolation at low ac amplitudes. In (FIG. 3A), m/z 284 was isolated during a 30 ms period during which a dual frequency isolation waveform consisted of 129 kHz, 3 $V_{pp}$, and 26 kHz, 6.2 $V_{pp}$. For (FIG. 3B) the isolation waveform consisted of three frequencies: 26 kHz, 0.7 $V_{pp}$, 144 kHz, 8 $V_{pp}$, and 278 kHz, 8 $V_{pp}$. In both experiments, m/z 100 was placed at $q_x$=0.7 during isolation, after having been placed at $q_x$=0.83 by the built-in scan function.
Figure 3B:
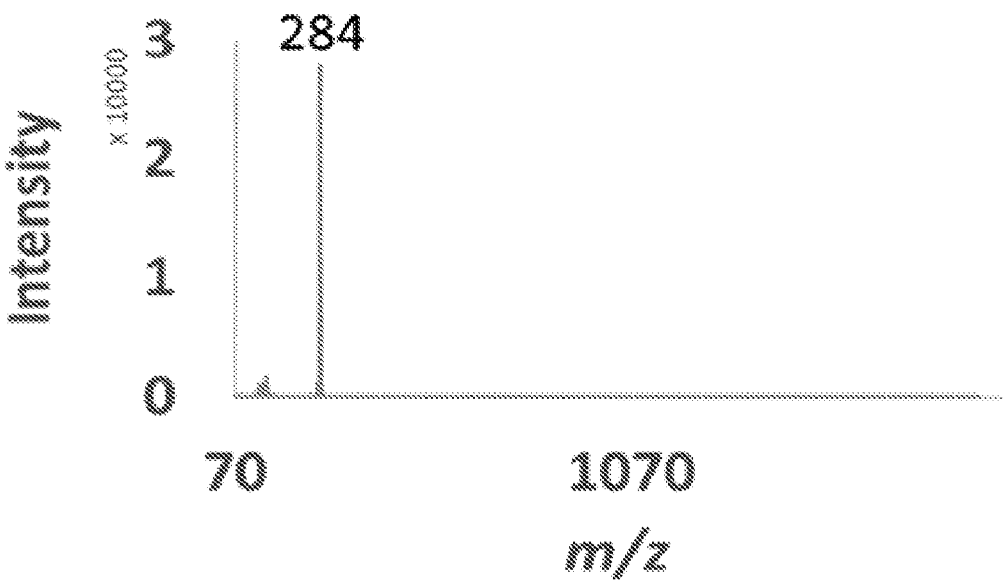

With methods of the invention, it may be preferable to use higher waveform amplitudes to promote ejection over a broad mass range particularly at high q (low mass ions) since the pseudopotential well depth increases. These amplitudes may be obtained with a broadband rf amplifier. In certain embodiments, more frequency components may be added while keeping the amplitude of the waveform low as shown with the ejection of low-mass ions illustrated in FIGS. 3A-B. That data shows that with the rf amplifier, the dual frequency isolation method ejects ions lower in mass than the selected ion. Addition of a third frequency component (FIG. 4B) improves the performance of the method, and the best results are obtained when the amplitude of the excitation waveform is increased.

Figure 4A:
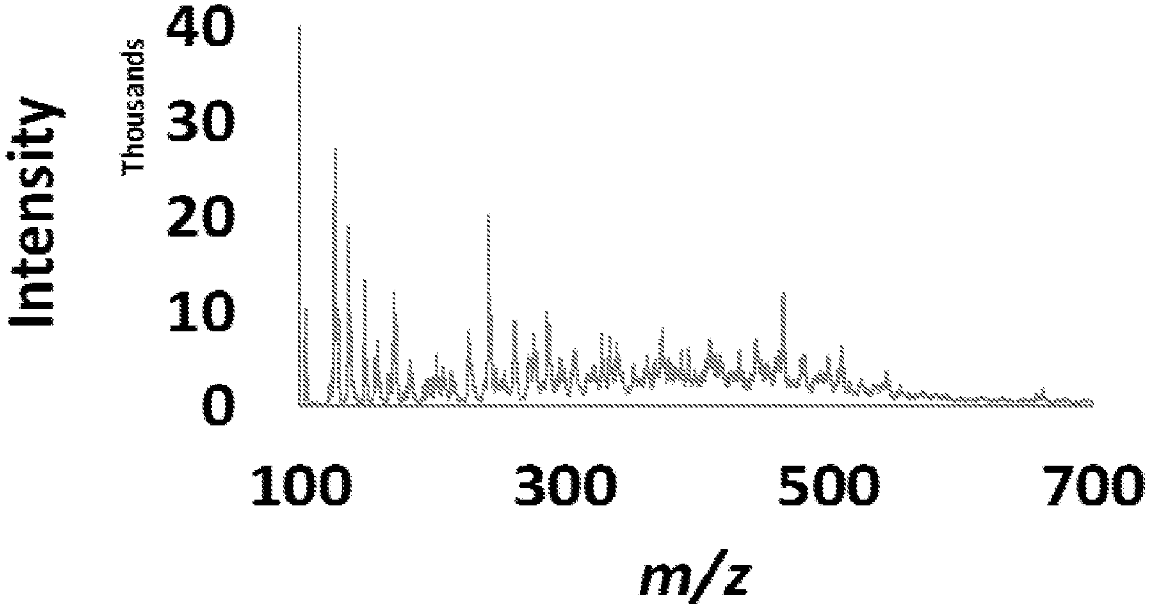
FIGS. 4A-C show isolation of bromine isotopes using dual frequency isolation.
Figure 4B:
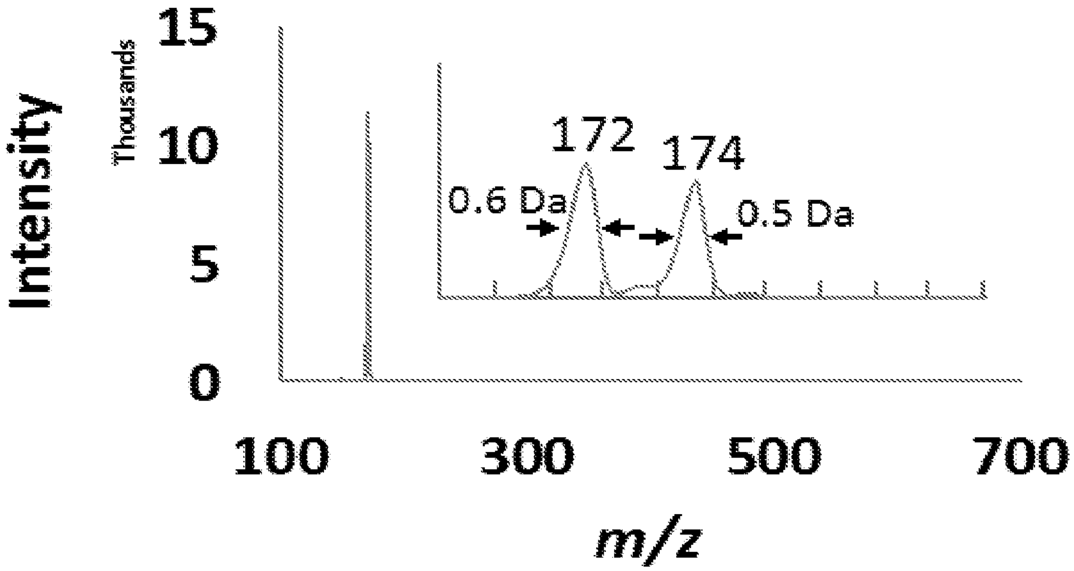
Figure 4C:
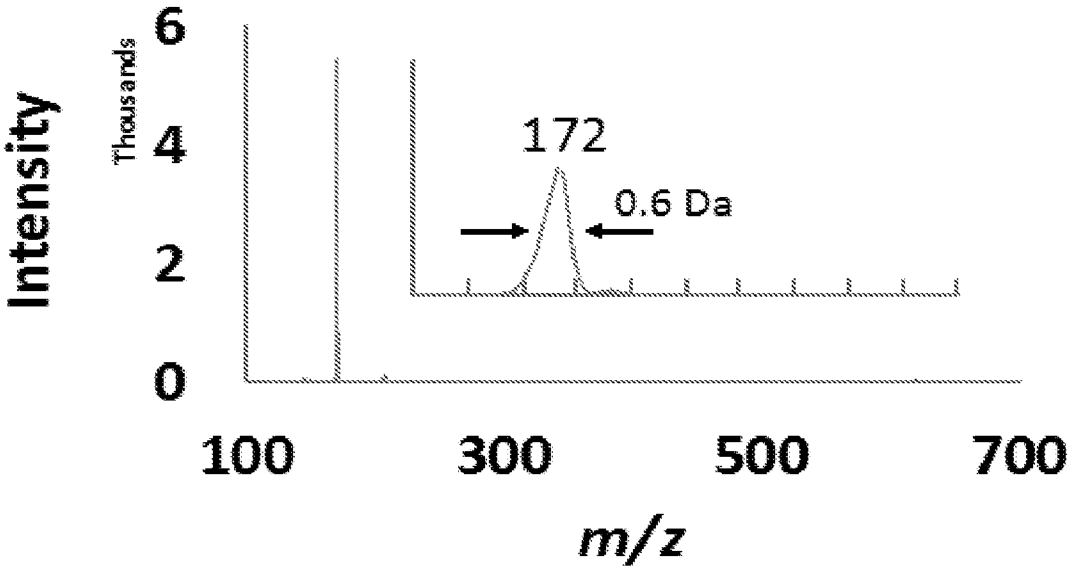

The ability to resolve isotopes is a useful application of ion isolation since it reduces the complexity of subsequent fragmentation patterns. This is demonstrated in FIGS. 4A-C, where a mixture of 4-chloroaniline, 2,4-dichloroaniline, and p-bromoaniline were analyzed by boundary ejection (FIG. 4A). FIG. 4B shows the isolation of both isomers of p-bromoaniline from the mixture using linear resonances corresponding to $\beta_x$=0.12 (69 kHz) and $\beta_x$=0.25 (149 kHz). The method can also resolve the $^{81}$Br isotope from $^{79}$Br, as shown in FIG. 4C. This was accomplished by shifting the resonance frequencies. An alternative is to change the amplitude of one or both of the frequency components. Furthermore, there is little to no signal attenuation observed when comparing FIGS. 4B and 4A to 4C and 4B, but as observed in other isolation methods, signal attenuation will increase with the quality of the isolation.

In various embodiments, the waveform may be applied for durations of about 30 μs or more. In preferred embodiments, about 300 ms or less of waveform application may be used The invention contemplates longer application durations longer than 300 ms as well but only small improvements may be observed beyond 30 ms of isolation.

Figure 5A:
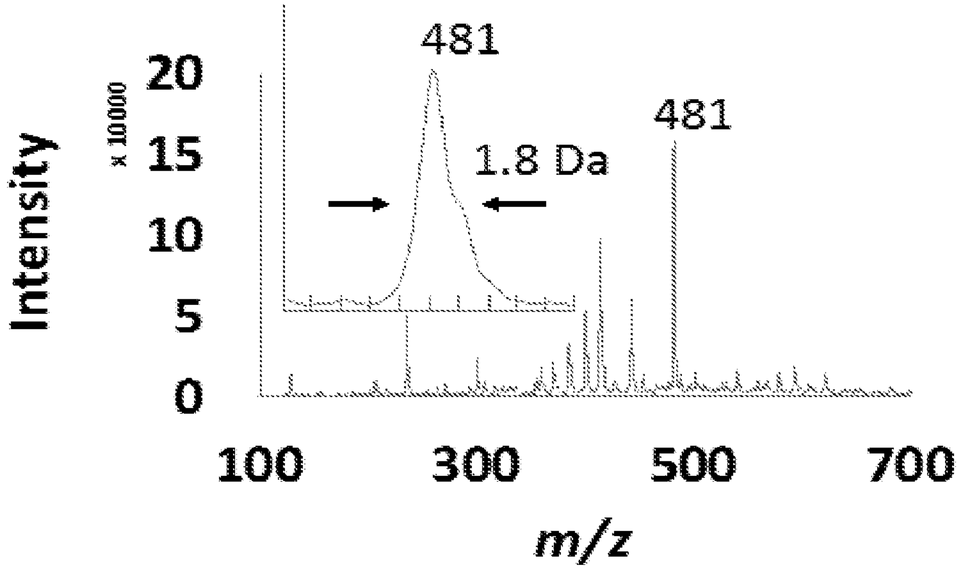
FIGS. 5A-C show application of dual frequency isolation to complex mixture analysis.
Figure 5B:
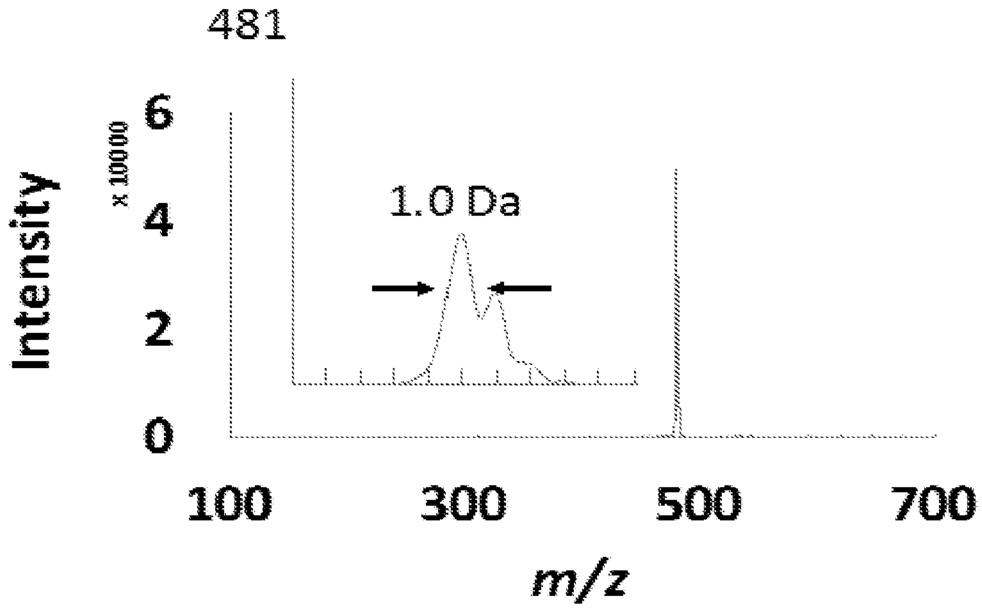
Figure 5C:
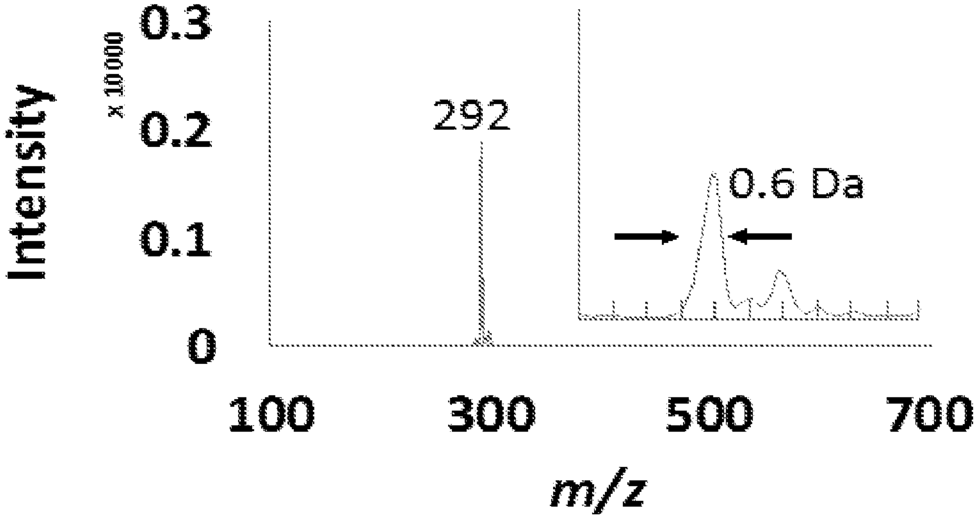

Ion isolation systems and methods of the present invention are particularly useful for ridding spectra of chemical noise when examining complex mixtures. FIG. 5A shows the full scan boundary ejection mass spectrum of a mixture of herbicides and their metabolites, with the inset spectra showing the poor resolution obtained from m/z 481, which is the base peak. Isolation of this analyte using a dual frequency sinusoidal waveform at 66 kHz, 20.58 $V_{pp}$, and 254 kHz, 9.63 $V_{pp}$, with an rf amplitude of 370 $V_{0\text{-}p}$, noticeably improves resolution (FIG. 5C). More importantly, m/z 291, which is likely a chlorinated metabolite of one of the herbicides and a minor component with very little signal intensity in the full scan, can be isolated with application of a 30 ms dual frequency waveform (30 ms isolation waveform of 64.1 kHz, 3.6 $V_{pp}$, plus 166 kHz, 17.28 $V_{pp}$, rf amplitude of 287 $V_{0\text{-}p}$). Thus, dual frequency isolation methods, according to certain embodiments, can, despite the simplicity of the procedure, be used to isolate both high and low abundance ions with the ability to isolate isotopic peaks from one another.

The dual-frequency isolation method demonstrated herein offers simplicity while largely maintaining good performance in terms of signal attenuation and isolation resolution. Smaller instruments may benefit from the simpler techniques disclosed herein. Other isolation methods (e.g., forward and subsequent reverse rf ramp, secular frequency scan, and Rf/dc isolation) though less commonly used, are also more complex than the current technique or do not offer equivalent performance.

Ion Generation

Any approach for generating ions known in the art may be employed. Exemplary mass spectrometry techniques that utilize ionization sources at atmospheric pressure for mass spectrometry include electrospray ionization (ESI; Fenn et al., Science, 246:64-71, 1989; and Yamashita et al., J. Phys. Chem., 88:4451-4459, 1984); atmospheric pressure ionization (APCI; Carroll et al., Anal. Chem. 47:2369-2373, 1975); and atmospheric pressure matrix assisted laser desorption ionization (AP-MALDI; Laiko et al. Anal. Chem., 72:652-657, 2000; and Tanaka et al. Rapid Commun. Mass Spectrom., 2:151-153, 1988). The content of each of these references in incorporated by reference herein its entirety.

Exemplary mass spectrometry techniques that utilize direct ambient ionization/sampling methods including desorption electrospray ionization (DESI; Takats et al., Science, 306:471-473, 2004 and U.S. Pat. No. 7,335,897); direct analysis in real time (DART; Cody et al., Anal. Chem., 77:2297-2302, 2005); Atmospheric Pressure Dielectric Barrier Discharge Ionization (DBDI; Kogelschatz, Plasma Chemistry and Plasma Processing, 23:1-46, 2003, and PCT international publication number WO 2009/102766), ion generation using a wetted porous material (Paper Spray, U.S. Pat. No. 8,859,956), and electrospray-assisted laser desorption/ionization (ELDI; Shiea et al., J. Rapid Communications in Mass Spectrometry, 19:3701-3704, 2005). The content of each of these references in incorporated by reference herein its entirety.

Ion generation can be accomplished by placing the sample on a porous material and generating ions of the sample from the porous material or other type of surface, such as shown in Ouyang et al., U.S. Pat. No. 8,859,956, the content of which is incorporated by reference herein in its entirety. Alternatively, the assay can be conducted and ions generated from a non-porous material, see for example, Cooks et al., U.S. patent application Ser. No. 14/209,304, the content of which is incorporated by reference herein in its entirety). In certain embodiments, a solid needle probe or surface to which a high voltage may be applied is used for generating ions of the sample (see for example, Cooks et al., U.S. patent application publication number 20140264004, the content of which is incorporated by reference herein in its entirety).

In certain embodiments, ions of a sample are generated using nanospray ESI. Exemplary nano spray tips and methods of preparing such tips are described for example in Wilm et al. (Anal. Chem. 2004, 76, 1165-1174), the content of which is incorporated by reference herein in its entirety. NanoESI is described for example in Karas et al. (Fresenius J Anal Chem. 2000 March-April; 366(6-7):669-76), the content of which is incorporated by reference herein in its entirety.

Ion Analysis

Figure 6:
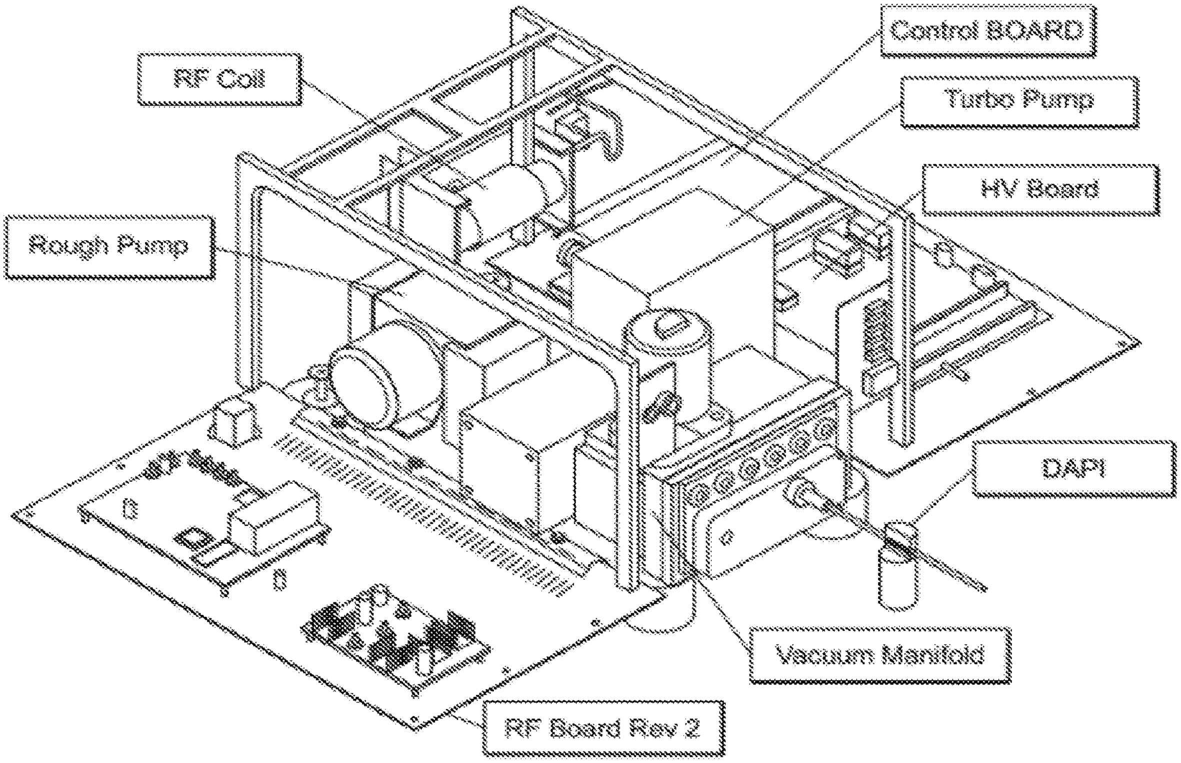
FIG. 6 is a picture illustrating various components and their arrangement in a miniature mass spectrometer.

In certain embodiments, the ions are analyzed by directing them into a mass spectrometer (bench-top or miniature mass spectrometer). FIG. 6 is a picture illustrating various components and their arrangement in a miniature mass spectrometer. The control system of the Mini 12 (Linfan Li, Tsung-Chi Chen, Yue Ren, Paul I. Hendricks, R. Graham Cooks and Zheng Ouyang "Miniature Ambient Mass Analysis System" Anal. Chem. 2014, 86 2909-2916, DOI: 10.1021/ac403766c; and 860. Paul I. Hendricks, Jon K. Dalgleish, Jacob T. Shelley, Matthew A. Kirleis, Matthew T. McNicholas, Linfan Li, Tsung-Chi Chen, Chien-Hsun Chen, Jason S. Duncan, Frank Boudreau, Robert J. Noll, John P. Denton, Timothy A. Roach, Zheng Ouyang, and R. Graham Cooks "Autonomous in-situ analysis and real-time chemical detection using a backpack miniature mass spectrometer: concept, instrumentation development, and performance" Anal. Chem., 2014, 86 2900-2908 DOI: 10.1021/ac403765x, the content of each of which is incorporated by reference herein in its entirety), and the vacuum system of the Mini 10 (Liang Gao, Qingyu Song, Garth E. Patterson, R. Graham Cooks and Zheng Ouyang, "Handheld Rectilinear Ion Trap Mass Spectrometer", Anal. Chem., 78 (2006) 5994-6002 DOI: 10.1021/ac061144k, the content of which is incorporated by reference herein in its entirety) may be combined to produce the miniature mass spectrometer shown in FIG. 6. It may have a size similar to that of a shoebox (H20×W25 cm×D35 cm). In certain embodiments, the miniature mass spectrometer uses a dual LIT configuration, which is described for example in Owen et al. (U.S. patent application Ser. No. 14/345,672), and Ouyang et al. (U.S. patent application Ser. No. 61/865,377), the content of each of which is incorporated by reference herein in its entirety.

The mass spectrometer (miniature or benchtop), may be equipped with a discontinuous interface. A discontinuous interface is described for example in Ouyang et al. (U.S. Pat. No. 8,304,718) and Cooks et al. (U.S. patent application publication number 2013/0280819), the content of each of which is incorporated by reference herein in its entirety.

System Architecture

Figure 7:
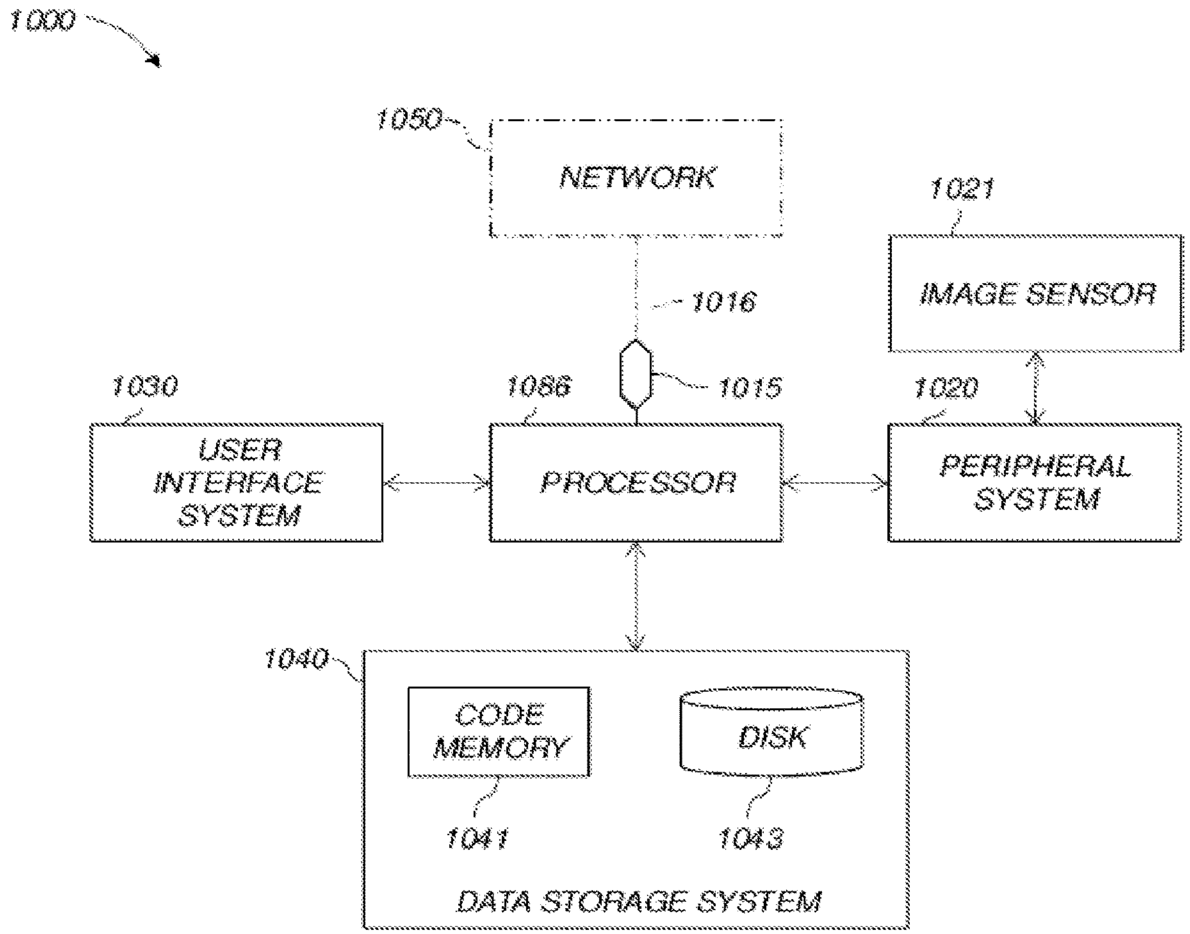
FIG. 7 shows a high-level diagram of the components of an exemplary data-processing system for analyzing data and performing other analyses described herein, and related components.

FIG. 7 is a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The data described above may be obtained using detector 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 which in one embodiment may be capable of real-time calculations (and in an alternative embodiment configured to perform calculations on a non-real-time basis and store the results of calculations for use later) can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (e.g., a tablet) connected, e.g., via a network or a null-modem cable, or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), Universal Serial Bus (USB) interface memory device, erasable programmable read-only memories (EPROM, EEPROM, or Flash), remotely accessible hard drives, and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive.

Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors) to cause functions, acts, or operational steps of various aspects herein to be performed by the processor 1086 (or other processor). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Analyzed Samples

The systems and methods of the invention can be used to analyze many different types of samples. A wide range of heterogeneous samples can be analyzed, such as biological samples, environmental samples (including, e.g., industrial samples and agricultural samples), and food/beverage product samples, etc.).

Exemplary environmental samples include, but are not limited to, groundwater, surface water, saturated soil water, unsaturated soil water; industrialized processes such as waste water, cooling water; chemicals used in a process, chemical reactions in an industrial processes, and other systems that would involve leachate from waste sites; waste and water injection processes; liquids in or leak detection around storage tanks; discharge water from industrial facilities, water treatment plants or facilities; drainage and leachates from agricultural lands, drainage from urban land uses such as surface, subsurface, and sewer systems; waters from waste treatment technologies; and drainage from mineral extraction or other processes that extract natural resources such as oil production and in situ energy production.

Additionally exemplary environmental samples include, but certainly are not limited to, agricultural samples such as crop samples, such as grain and forage products, such as soybeans, wheat, and corn. Often, data on the constituents of the products, such as moisture, protein, oil, starch, amino acids, extractable starch, density, test weight, digestibility, cell wall content, and any other constituents or properties that are of commercial value is desired.

Exemplary biological samples include a human tissue or bodily fluid and may be collected in any clinically acceptable manner. A tissue is a mass of connected cells and/or extracellular matrix material, e.g. skin tissue, hair, nails, nasal passage tissue, CNS tissue, neural tissue, eye tissue, liver tissue, kidney tissue, placental tissue, mammary gland tissue, placental tissue, mammary gland tissue, gastrointestinal tissue, musculoskeletal tissue, genitourinary tissue, bone marrow, and the like, derived from, for example, a human or other mammal and includes the connecting material and the liquid material in association with the cells and/or tissues. A body fluid is a liquid material derived from, for example, a human or other mammal. Such body fluids include, but are not limited to, mucous, blood, plasma, serum, serum derivatives, bile, blood, maternal blood, phlegm, saliva, sputum, sweat, amniotic fluid, menstrual fluid, mammary fluid, peritoneal fluid, urine, semen, and cerebrospinal fluid (CSF), such as lumbar or ventricular CSF. A sample may also be a fine needle aspirate or biopsied tissue. A sample also may be media containing cells or biological material. A sample may also be a blood clot, for example, a blood clot that has been obtained from whole blood after the serum has been removed.

In one embodiment, the biological sample can be a blood sample, from which plasma or serum can be extracted. The blood can be obtained by standard phlebotomy procedures and then separated. Typical separation methods for preparing a plasma sample include centrifugation of the blood sample. For example, immediately following blood draw, protease inhibitors and/or anticoagulants can be added to the blood sample. The tube is then cooled and centrifuged, and can subsequently be placed on ice. The resultant sample is separated into the following components: a clear solution of blood plasma in the upper phase; the buffy coat, which is a thin layer of leukocytes mixed with platelets; and erythrocytes (red blood cells). Typically, 8.5 mL of whole blood will yield about 2.5-3.0 mL of plasma.

Blood serum is prepared in a very similar fashion. Venous blood is collected, followed by mixing of protease inhibitors and coagulant with the blood by inversion. The blood is allowed to clot by standing tubes vertically at room temperature. The blood is then centrifuged, wherein the resultant supernatant is the designated serum. The serum sample should subsequently be placed on ice.

Prior to analyzing a sample, the sample may be purified, for example, using filtration or centrifugation. These techniques can be used, for example, to remove particulates and chemical interference. Various filtration media for removal of particles includes filer paper, such as cellulose and membrane filters, such as regenerated cellulose, cellulose acetate, nylon, PTFE, polypropylene, polyester, polyethersulfone, polycarbonate, and polyvinylpyrolidone. Various filtration media for removal of particulates and matrix interferences includes functionalized membranes, such as ion exchange membranes and affinity membranes; SPE cartridges such as silica- and polymer-based cartridges; and SPE (solid phase extraction) disks, such as PTFE- and fiberglass-based. Some of these filters can be provided in a disk format for loosely placing in filter holdings/housings, others are provided within a disposable tip that can be placed on, for example, standard blood collection tubes, and still others are provided in the form of an array with wells for receiving pipetted samples. Another type of filter includes spin filters. Spin filters consist of polypropylene centrifuge tubes with cellulose acetate filter membranes and are used in conjunction with centrifugation to remove particulates from samples, such as serum and plasma samples, typically diluted in aqueous buffers.

Filtration is affected in part, by porosity values, such that larger porosities filter out only the larger particulates and smaller porosities filtering out both smaller and larger porosities. Typical porosity values for sample filtration are the 0.20 and 0.45 μm porosities. Samples containing colloidal material or a large amount of fine particulates, considerable pressure may be required to force the liquid sample through the filter. Accordingly, for samples such as soil extracts or wastewater, a prefilter or depth filter bed (e.g. "2-in-1" filter) can be used and which is placed on top of the membrane to prevent plugging with samples containing these types of particulates.

In some cases, centrifugation without filters can be used to remove particulates, as is often done with urine samples. For example, the samples are centrifuged. The resultant supernatant is then removed and frozen.

After a sample has been obtained and purified, the sample can be analyzed. With respect to the analysis of a blood plasma sample, there are many elements present in the plasma, such as proteins (e.g., Albumin), ions and metals (e.g., iron), vitamins, hormones, and other elements (e.g., bilirubin and uric acid). Any of these elements may be detected. More particularly, systems of the invention can be used to detect molecules in a biological sample that are indicative of a disease state. Specific examples are provided below.

Where one or more of the target molecules in a sample are part of a cell, the aqueous medium may also comprise a lysing agent for lysing of cells. A lysing agent is a compound or mixture of compounds that disrupt the integrity of the membranes of cells thereby releasing intracellular contents of the cells. Examples of lysing agents include, but are not limited to, non-ionic detergents, anionic detergents, amphoteric detergents, low ionic strength aqueous solutions (hypotonic solutions), bacterial agents, aliphatic aldehydes, and antibodies that cause complement dependent lysis, for example. Various ancillary materials may be present in the dilution medium. All of the materials in the aqueous medium are present in a concentration or amount sufficient to achieve the desired effect or function.

In some examples, where one or more of the target molecules are part of a cell, it may be desirable to fix the cells of the sample. Fixation of the cells immobilizes the cells and preserves cell structure and maintains the cells in a condition that closely resembles the cells in an in vivo-like condition and one in which the antigens of interest are able to be recognized by a specific affinity agent. The amount of fixative employed is that which preserves the cells but does not lead to erroneous results in a subsequent assay. The amount of fixative may depend for example on one or more of the nature of the fixative and the nature of the cells. In some examples, the amount of fixative is about 0.05% to about 0.15% or about 0.05% to about 0.10%, or about 0.10% to about 0.15% by weight. Agents for carrying out fixation of the cells include, but are not limited to, cross-linking agents such as, for example, an aldehyde reagent (such as, e.g., formaldehyde, glutaraldehyde, and paraformaldehyde); an alcohol (such as, e.g., $C_1$-$C_5$ alcohols such as methanol, ethanol and isopropanol); a ketone (such as a $C_3$-$C_5$ ketone such as acetone); for example. The designations $C_1$-$C_5$ or $C_3$-$C_5$ refer to the number of carbon atoms in the alcohol or ketone. One or more washing steps may be carried out on the fixed cells using a buffered aqueous medium.

If necessary after fixation, the cell preparation may also be subjected to permeabilization. In some instances, a fixation agent such as, an alcohol (e.g., methanol or ethanol) or a ketone (e.g., acetone), also results in permeabilization and no additional permeabilization step is necessary. Permeabilization provides access through the cell membrane to target molecules of interest. The amount of permeabilization agent employed is that which disrupts the cell membrane and permits access to the target molecules. The amount of permeabilization agent depends on one or more of the nature of the permeabilization agent and the nature and amount of the cells. In some examples, the amount of permeabilization agent is about 0.01% to about 10%, or about 0.1% to about 10%. Agents for carrying out permeabilization of the cells include, but are not limited to, an alcohol (such as, e.g., $C_1$-$C_5$ alcohols such as methanol and ethanol); a ketone (such as a $C_3$-$C_5$ ketone such as acetone); a detergent (such as, e.g., saponin, TRITON X-100 (4-(1,1,3,3-Tetramethylbutyl)phenyl-polyethylene glycol, t-Octylphenoxypolyethoxyethanol, Polyethylene glycol tert-octylphenyl ether buffer, commercially available from Sigma Aldrich), and TWEEN-20 (Polysorbate 20, commercially available from Sigma Aldrich)). One or more washing steps may be carried out on the permeabilized cells using a buffered aqueous medium.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

Equivalents

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

EXAMPLES

Mass-selective ion isolation in quadrupole ion traps is typically performed using stored waveform inverse Fourier transform (SWIFT) techniques, which exhibit excellent performance and versatility but require complex calculations and waveform generation. Portable instruments in particular would benefit from a simpler method of ion isolation. A high amplitude sinusoidal waveform with just two frequencies is used for isolation. The two frequencies are placed higher and lower than the isolated ion secular frequency, and their amplitudes are increased so each ejects a wide window of ions. Despite its simplicity, the method demonstrates remarkable performance, e.g. isolation of bromine isotopes. Both major and minor components of complex mixtures are isolated, with little signal attenuation. Typically, isolation is performed at low Mathieu q values as more resonances are then easily accessible. This contrasts with SWIFT isolation, which is generally performed at high q values (q=0.8). Accordingly, the invention provides a simple alternative to SWIFT isolation using dual frequencies corresponding to broad linear resonances is introduced. The number of frequencies required for isolation of a single ion is reduced by ca. three orders of magnitude but performance is largely unaffected compared to SWIFT.

Example 1: Materials and Methods

Ionization: All ions were generated by nanoelectrospray ionization (nESI) at 2 kV. Borosilicate glass capillaries (1.5 mm O.D., 0.86 mm I.D., 10 cm length) were obtained from Sutter Instrument Co. (Novato, CA, USA) were pulled to an approximate outer diameter of 5 μm using a Flaming/Brown micropipette puller from Sutter Instrument Co. (model P-97).

Chemicals: dDidodecyldimethylammonium bromide was purchased from Sigma Aldrich (St. Louis, Missouri, USA), hexadecyltrimethylammonium bromide was purchased from Tokyo Chemical Industry Co. (Tokyo, Japan), and benzylhexadecyldimethylammonium chloride was purchased from JT Baker Chemical Co (Phillipsburg, New Jersey, USA). p-Bromoaniline was purchased from Eastman Kodak Co. (Rochester, NY, USA). 2,4-Dichloroaniline and 4-chloroaniline were purchased from Aldrich Chemical Company, Inc. (Milwaukee, WI, USA). EPA 508.1 herbicide mix (a mixture of alachlor, butachlor, simazine, atrazine, metolachlor, and hexachlorocyclopentadiene) was purchased from Sigma Aldrich (Bellefonte, Pennsylvania, USA, respectively). Reagents were dissolved in HPLC grade methanol and then diluted in 50:50 MeOH:H2O with 0.1% formic acid to final concentrations of ~5 ppm.

Instrumentation: All experiments were performed using the positive ion mode on a Thermo LTQ XL linear ion trap mass spectrometer interfaced to an Orbitrap (San Jose, CA, USA), though the latter component was not used in these experiments. The normal scan rate of 60 μs/Da was used, but boundary ejection with an rf frequency of 1175 kHz was performed instead of using the instrument's built-in resonance ejection. The resonance waveforms normally generated by the LTQ's analog board were replaced by waveforms supplied from a Keysight 33612A arbitrary waveform generator (Newark, South Carolina, USA). The generator was triggered at the start of the activation period using the triggers in the LTQ Tune diagnostics menu. A dual-frequency isolation waveform (amplitude typically 2-20 Vpp for each frequency) was used for ion isolation. The two sine waves generated were summed, output on a single channel, amplified using a Mini-Circuits RF power amplifier (model TIA-1000-1R8), and applied in a dipolar manner to the x electrodes of the linear ion trap. The waveform typically had a duration of 30 ms. The stated bandwidth of the if amplifier was 0.5-1000 MHz, but signals down to ~60 kHz were able to be amplified. This limited the mass range in these experiments to ~m/z 800.

What is claimed is:

1. A system, the system comprising:

a mass spectrometer comprising an ion trap; and a central processing unit (CPU), and storage coupled to the CPU for storing instructions that when executed by the CPU cause the system to apply a dual frequency waveform to the ion trap that ejects non-target ions from the ion trap while retaining a target ion in the ion trap, wherein the dual frequency waveform consists of a combination of two linear resonances, wherein a first of the two linear resonances is chosen to eject the non-target ions lower in mass than the target ion and a second of the two linear resonances is chosen to eject the non-target ions higher in mass than the target ion, wherein the two linear resonances are applied over a plurality of time points.

2. The system according to claim 1, wherein the CPU is further caused to apply a third frequency along with the dual frequency waveform in order to isolate a second target ion.

3. The system according to claim 1, wherein the dual frequency waveform comprises first and second frequencies that are applied simultaneously.

4. The system according to claim 1, wherein the dual frequency waveform comprises first and second frequencies that are applied sequentially.

5. The system according to claim 1, wherein a first frequency of the dual frequency waveform is higher than a secular frequency of the target ion.

6. The system according to claim 5, wherein the first frequency is accessible by low alternating current (AC) amplitudes.

7. The system according to claim 6, wherein more frequencies of motion are accessed upon increasing the AC amplitude.

8. The system according to claim 5, wherein a second frequency of the dual frequency waveform is lower than a secular frequency of the target ion.

9. The system according to claim 8, wherein the second frequency is accessible by low alternating current (AC) amplitudes.

10. The system according to claim 9, wherein more frequencies of motion are accessed upon increasing the AC amplitude.

11. A system, the system comprising:

a mass spectrometer comprising an ion trap; and a central processing unit (CPU), and storage coupled to the CPU for storing instructions that when executed by the CPU cause the system to:

apply a dual frequency waveform to the ion trap, wherein the dual frequency waveform consists of a combination of two linear resonances in which:

a first frequency of the dual frequency waveform that is applied to the ion trap is higher than a secular frequency of a target ion in the ion trap; and a second frequency of the dual frequency waveform that is applied to the ion trap is lower than the secular frequency of the target ion in the ion trap;

wherein the two linear resonances are applied over a plurality of time points.

12. The system according to claim 11, wherein the first and second frequency of the dual frequency waveforms are applied simultaneously to the ion trap.

13. The system according to claim 11, wherein the first and second frequency waveforms are sinusoidal waveforms.

14. The system according to claim 11, wherein the first frequency of the dual frequency waveform is accessible by low alternating current (AC) amplitudes.

15. The system according to claim 14, wherein more frequencies of motion are accessed upon increasing the AC amplitude.

16. The system according to claim 11, wherein the second frequency of the dual frequency waveform is accessible by low alternating current (AC) amplitudes.

17. The system according to claim 16, wherein more frequencies of motion are accessed upon increasing the AC amplitude.

18. The system according to claim 11, wherein the mass spectrometer is a miniature mass spectrometer.

19. The system according to claim 11, wherein the ion trap is a quadrupole ion trap.

* * * * *